UNITED STATES PATENT OFFICE.

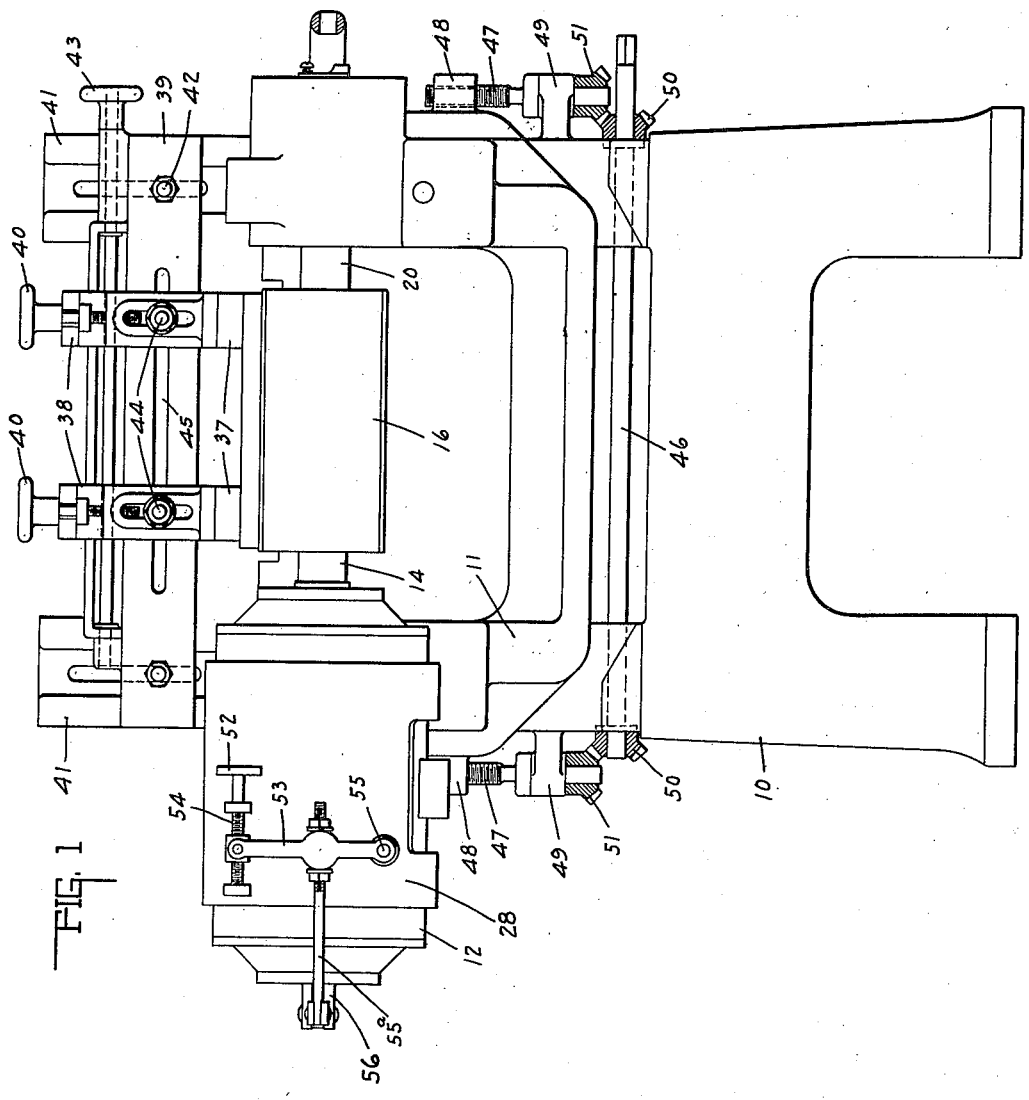

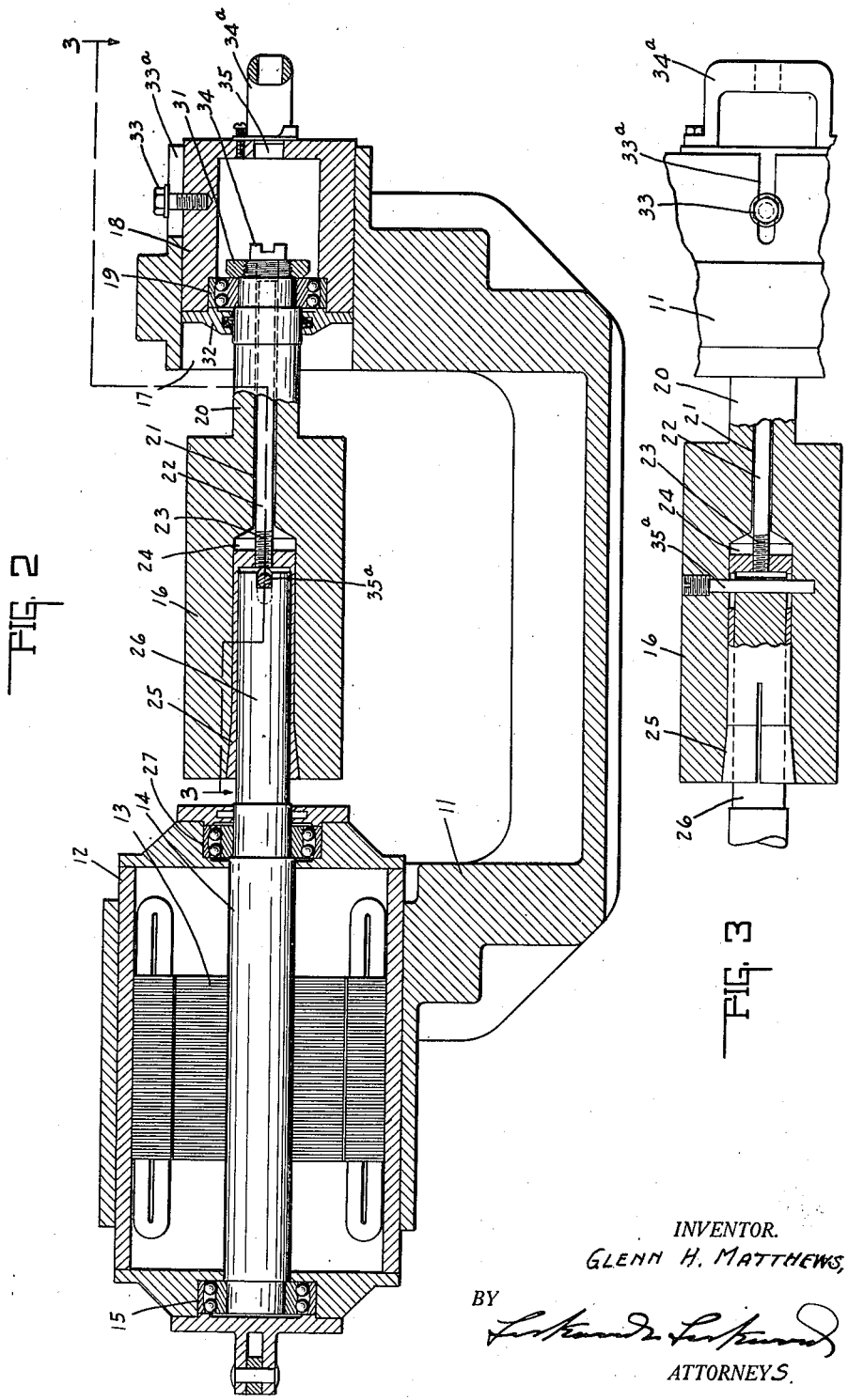

GLENN H. MATTHEWS, OF INDIANAPOLIS, INDIANA, ASSIGNOR TO ANTON VONNEGUT, OF INDIANAPOLIS, INDIANA.

REMOVABLE CUTTER HEAD FOR MOTOR-DRIVEN MOLDERS.

1,426,492.  Specification of Letters Patent.  Patented Aug. 22, 1922.

Application filed March 17, 1922. Serial No. 544,524.

*To all whom it may concern:*

Be it known that I, GLENN H. MATTHEWS, a citizen of the United States, and a resident of Indianapolis, county of Marion, and State of Indiana, have invented a certain new and useful Removable Cutter Head for Motor-Driven Molders; and I do hereby declare that the following is a full, clear, and exact description thereof, reference being had to the accompanying drawings, in which like numerals refer to like parts.

This invention relates to a new and useful improvement in moulding machines for wood working and the like, and particularly to the means for mounting the cutter head and shaft in the carriage of the machine, whereby the entire cutter head and shaft may be readily set therein or removed without removing any of the parts thereof.

The particular feature of the invention resides in the manner of removably securing a cutter head to the motor driven spindle, whereby said cutter head may be readily removed therefrom, to be replaced by a different type of cutter head or one that is larger or smaller. Heretofore cutter heads have been usually made detachable from the spindle so as to be slidably mounted thereon and secured to the spindle at approximately the center thereof. With this type, it is necessary to take down the bearings which support one end of the spindle in order to remove the cutter head from one end. Other types of cutter heads have been formed integral with a shaft which is mounted at one end in suitable bearings and detachably secured at the other end to the end of the spindle. However, in this cutter head, the head itself is detachably secured to the end of the spindle and is provided with a spindle formed integral therewith supported in one of the bearings which is removable bodily with the cutter head from the carriage.

For a further understanding of this invention, reference may be had to the patent issued to Monte B. Gathman, February 14, 1922, No. 1,406,843 for "Cutter head spindle for planers and molders."

The full nature of the invention will be understood from the accompanying drawings and the following description and claims.

In the drawings, Fig. 1 is an end view of the moulding machine with the cutter head mounted therein, the supporting table being broken away. Fig. 2 is a central vertical section of the carriage, cutter head and motor. Fig. 3 is a section taken on the line 3—3 of Fig. 2, with parts broken away.

In the drawings there is shown a moulding machine having a base 10 upon which is supported a carriage 11, said carriage supporting a motor housing 12 in which there is a motor 13 adapted to drive a spindle 14 which is integral therewith, said spindle being supported within the bearings 15 secured on one side of said carriage for the purpose of electrically driving said spindle and cutter head 16. The opposite side of the carriage 11 is provided with an opening 17 which carries a bearing support and closure, said opening being of a larger diameter than the cutter head 16 and in which snugly fits a bearing housing 18 for enclosing and supporting the bearings 19 of the cutter head supporting shaft 20.

The shaft 20 and cutter head 16 are formed integral and are provided with a central bore 21 through which extends a bolt 22 having a threaded end 23 adapted to project into a larger tapered bore 24 extending centrally from about the center of the cutter head to the end thereof opposite the integral shaft 20. The bore 24 is formed of such size as to receive a flared split retaining sleeve 25 into which the reduced end 26 of the spindle 14 is adapted to extend, said reduced end of the spindle 14 being supported in the bearings 27 mounted in the supporting sleeve 28 mounted on the carriage 11, and rigidly secured thereon.

The integral shaft 20 of the cutter head is secured in the bearings 19 by the retaining nut 31 adapted to screw on the end thereof and is also supported by the head 32 secured to the bearing housing 18. Said housing is slidably mounted in the opening 17 of the carriage 11 and is secured therein by means of a stud and nut 33 slidable in the slot 33ª. The bolt 22 has a recessed head 34 extending through the end of the shaft 20 and bearing against said end, as shown. There is an opening 35 in the end of the housing 18 through which a tool may be extended for engaging in the head of the bolt head 34 for turning the same; and there is also provided a handle 34ª for conveniently drawing the bearing housing from the carriage.

To secure the cutter head upon the spindle, the split sleeve 25 is inserted in the bore 24 and the bolt 22 screwed into the end thereof. The radial driving pin 35ª is inserted through a radial hole in the head and elongated radial opening in the sleeve, as shown in Fig. 3. The cutter head is inserted through the opening 17, and is so positioned as to permit the end of the spindle 26 to enter the sleeve. After the cutter head has been properly adjusted and positioned over said spindle, the bearing housing 18 is clamped down by the stud and nut 33, and a tool is inserted to engage the bolt head 34 for turning the bolt and screwing up the split sleeve 25 so as to cause it to wedge and lock about said spindle, thereby rigidly locking the cutter head thereon. To remove the cutter head from the shaft, the bolt 22 is turned so as to force the sleeve from its clamping position, causing the release of the cutter head from the spindle. The stud and nut 33 may then be loosened and the entire bearing housing 18, cutter head and shaft 20 may be withdrawn through the opening 17 of the carriage.

From the foregoing description of the cutter head, shaft and carriage, it will be observed that the cutter head may be readily removed and a new cutter head replaced of a different shape and different size without the necessity of disturbing the ball bearing and supports. This facilitates the handling of the machine for different pieces of work. The mounting of the machine and its adjustment to the work is shown in Fig. 1. There, the work as shown adjacent the upper portion of the cutter head 16 is held in place by the wooden presser blocks 37 adjustably secured on the brackets 38 which are adjusted to the presser block beam 39 by the adjusting hand wheels 40. The beam 39 may be raised or lowered on the standards 41 and secured in proper position by the bolts 42; whereas the brackets 38 may be adjusted longitudinally of the beam by means of the hand wheel 43, causing the guide bolts 44 to slide longitudinally of the guide slots 45 extending longitudinally of the beam.

The carriage, motor and cutter head may be adjusted to the base of the machine or the work and its support, by means of the shaft 46 which may be turned by a crank, for turning the screws 47, which screw into the brackets 48 secured to the sides of the carriage, said screws being supported in the bearings 49 secured on the side of the base. The screws 47 are turned by means of the shaft 46 through the bevel gears 50 and 51 respectively.

A fine adjustment of the motor housing 12 and the parts secured thereto, including the shaft 14 and the cutter head, may be had longitudinally of the carriage, by means of sliding said housing within the surrounding supporting sleeve 28 longitudinally of said carriage by the hand wheel 52 which operates a lever 53 pivoted at one end to said sleeve at 55 through the threaded shaft 54 which controls the rod 55ª pivoted to the ear 56 on said housing, and secured to the housing 12 at its other end, thereby sliding said motor housing and spindle longitudinally of said carriage and enabling the cutter head to be finely adjusted, as more fully disclosed in application for Letters Patent Serial No. 544,650, filed March 17, 1922, by Anton Vonnegut.

The invention claimed is:

1. A bearing support, a cutter head, a spindle carried by said support and extending into said cutter head, a bearing support for said cutter head, and means extending through the opposite end of said cutter head from said spindle and through said latter bearing support for causing said spindle to be locked within said cutter head.

2. A bearing support, a cutter head, a spindle carried by said support and extending into said cutter head, a bearing support for said cutter head, means extending through the opposite end of said cutter head from said spindle and through said latter bearing support for causing said spindle to be locked within said cutter head, a bolt extending centrally through the end of said cutter head, and means within said cutter head for causing said spindle to be clamped therein when said bolt is turned in one direction, and released therefrom when the bolt is turned in the opposite direction.

3. A bearing support, a cutter head, a spindle carried by said support and extending into said cutter head, a bearing support for said cutter head, means extending through the opposite end of said cutter head from said spindle and through said latter bearing support for causing said spindle to be locked within said cutter head, a bolt extending centrally through the end of said cutter head, and a split apertured sleeve mounted within said cutter head and surrounding said spindle for rigidly locking said cutter head and spindle to each other when said bolt is turned in one direction and releasing said spindle and cutter head when turned in the opposite direction.

In witness whereof, I have hereunto affixed my signature

GLENN H. MATTHEWS.